United States Patent
Goyal et al.

(10) Patent No.: US 11,693,977 B2
(45) Date of Patent: Jul. 4, 2023

(54) SOFTWARE DEFINED DATA SECURITY LAYER

(71) Applicant: International Business Machines Corporation, Armonk, NY (US)

(72) Inventors: Prateek Goyal, Indore (IN); Seema Nagar, Bangalore (IN); Manish Anand Bhide, Hyderabad (IN); Kuntal Dey, Rampurhat (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 17/064,804

(22) Filed: Oct. 7, 2020

(65) Prior Publication Data
US 2022/0108030 A1 Apr. 7, 2022

(51) Int. Cl.
| | |
|---|---|
| G06F 21/62 | (2013.01) |
| G06F 21/60 | (2013.01) |
| G06Q 10/10 | (2023.01) |
| G06Q 10/0635 | (2023.01) |
| G06F 40/30 | (2020.01) |
| G06N 5/02 | (2023.01) |
| H04L 67/10 | (2022.01) |
| G06Q 10/0631 | (2023.01) |
| G06Q 30/04 | (2012.01) |

(52) U.S. Cl.
CPC .......... *G06F 21/62* (2013.01); *G06F 21/602* (2013.01); *G06F 40/30* (2020.01); *G06N 5/02* (2013.01); *G06Q 10/0635* (2013.01); *G06Q 10/10* (2013.01); *G06Q 10/06315* (2013.01); *G06Q 30/04* (2013.01); *H04L 67/10* (2013.01)

(58) Field of Classification Search
CPC ........ G06F 21/62; G06F 21/602; G06F 40/30; G06N 5/02; G06Q 10/0635; G06Q 10/10
See application file for complete search history.

(56) References Cited

U.S. PATENT DOCUMENTS

| | | |
|---|---|---|
| 7,647,630 B2 | 1/2010 | Arroyo et al. |
| 7,779,254 B1 | 8/2010 | Crosmer et al. |
| 8,165,301 B1 | 4/2012 | Bruce et al. |
| 8,843,750 B1 * | 9/2014 | Sokolov ............... H04L 63/061 713/175 |
| 8,904,556 B1 | 12/2014 | Bertram et al. |

(Continued)

FOREIGN PATENT DOCUMENTS

WO 2016010602 A3 1/2016

OTHER PUBLICATIONS

Gholami et al., "Security and Privacy of Sensitive Data in Cloud Computing: A Survey of Recent Developments," Computer Science, Cryptography and Security, Jan. 2016, 20 pages, DOI: 10.5121/csit.2015.51611.

(Continued)

*Primary Examiner* — Thaddeus J Plecha
(74) *Attorney, Agent, or Firm* — Grant Johnson (57) ABSTRACT

A software defined data security level method, computer program product, and data processing system. One embodiment may comprise intercepting, by a processor at a data security layer, an input/output (IO) request from a local software application, wherein the IO request includes a header and a data payload, analyzing, by the processor at the data security layer, the data payload of the IO request relative to a service level agreement (SLA), assigning, by the processor at the data security layer, a security level to the IO request based on the analysis.

20 Claims, 6 Drawing Sheets

(56) References Cited

U.S. PATENT DOCUMENTS

| | | | |
|---|---|---|---|
| 9,100,342 B1* | 8/2015 | Konduru | H04L 41/5003 |
| 9,141,815 B2 | 9/2015 | Burchett et al. | |
| 9,990,502 B2 | 6/2018 | Haager et al. | |
| 10,528,754 B1* | 1/2020 | Cox, Jr. | H04L 9/14 |
| 10,795,985 B2 | 10/2020 | Attfield | |
| 11,425,106 B2* | 8/2022 | Goodyear | H04L 63/0428 |
| 2011/0276490 A1* | 11/2011 | Wang | H04L 9/14 |
| | | | 705/317 |
| 2014/0201846 A1* | 7/2014 | Anantharam | H04L 63/0281 |
| | | | 726/26 |
| 2016/0117519 A1 | 4/2016 | Hashii et al. | |
| 2018/0198771 A1* | 7/2018 | Ghosh | H04L 63/083 |
| 2018/0288099 A1 | 10/2018 | Rubakha et al. | |

OTHER PUBLICATIONS

He et al., "Block-Stream as a Service: A More Secure, Nimble, and Dynamically Balanced Cloud Service Model for Ambient Computing," IEEE Network, vol. 32, Issue 1, Jan.-Feb. 2018, 7 pages DOI: 10.1109/MNET.2018.1700167.

Gholami et al., "Big Data Security and Privacy Issues in the Cloud," International Journal of Network Security & Its Applications (IJNSA) vol. 8, No.1, Jan. 2016, 21 pages, DOI: 10.5121/ijnsa.2016. 810459BIG.

Mell et al., "The NIST Definition of Cloud Computing," Recommendations of the National Institute of Standards and Technology, U. S. Department of Commerce, Special Publication 800-145, Sep. 2011, 7 pages.

"Virtualization," IBM Cloud Learn Hub, Jun. 19, 2019, 13 pages, https://www.ibm.com/cloud/learn/virtualization-a-complete-guide.

* cited by examiner

SOFTWARE DEFINED DATA SECURITY LAYER

BACKGROUND

The present disclosure relates to data security, and more specifically, to a software defined data security layer.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

An emerging information technology (IT) delivery model is cloud computing, through which shared resources, software, and information are provided over the Internet to computers and other devices on-demand. Cloud computing can significantly reduce IT costs and complexities while improving workload optimization and service delivery. Most cloud computing infrastructure consists of reliable services delivered through data centers and built on servers.

SUMMARY

According to embodiments of the present disclosure, a software defined data security level method. One embodiment may comprise intercepting, by a processor at a data security layer, an input/output (IO) request from a local software application, wherein the IO request includes a header and a data payload, analyzing, by the processor at the data security layer, the data payload of the IO request relative to a service level agreement (SLA), assigning, by the processor at the data security layer, a security level to the IO request based on the analysis.

According to embodiments of the present disclosure, a data processing system comprising a processor and a memory coupled to the processor. The memory in some embodiments may contain program instructions executable by a processor to cause the processor to intercept, at a data security layer, an input/output (IO) request from a local software application, wherein the IO request includes a header and a data payload, analyze, at the data security layer, the data payload of the IO request relative to a service level agreement (SLA), and assign, at the data security layer, a security level to the IO request based on the analysis.

According to embodiments of the present disclosure, a computer program product for a software defined data security layer. The computer program product in one embodiment may comprise a computer readable storage medium having program instructions embodied therewith. The program instructions may be executable by a processor to cause the processor to intercept, at a data security layer, an input/output (IO) request from a local software application, wherein the IO request includes a header and a data payload, analyze, at the data security layer, the data payload of the IO request relative to a service level agreement (SLA), and assign, at the data security layer, a security level to the IO request based on the analysis.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate data security; more particular aspects relate to a software defined data security layer. While the present disclosure is not necessarily limited to such applications, various aspects of the disclosure may be appreciated through a discussion of various examples using this context.

Virtualization uses software to create an abstraction layer over computer hardware that allows the hardware elements of a single computer e.g., processors, memory, and storage to be divided into multiple virtual computers, commonly called virtual machines (VMs). Each VM runs its own operating system (OS) and behaves like an independent computer, even though it is running on just a portion of the actual underlying computer hardware.

Virtualization brings several benefits to data center operators and service providers, including resource efficiency, easier management, reduced downtime, and faster provisioning. For example, before virtualization, each application server typically required its own dedicated physical CPU for reliability reasons. This meant that IT staff would purchase and configure a separate server for each application they wanted to run. Invariably, each physical server would be underused. In contrast, server virtualization can run several applications, each on its own VM with its own operating system, on a single physical computer without sacrificing reliability. This enables maximum utilization of the physical hardware's computing capacity.

Replacing physical computers with software-defined VMs may also make it easier to use and manage policies written in software. This allows one to create automated IT service management workflows. For example, automated deployment and configuration tools enable administrators to define collections of virtual machines and applications as services, in software templates. This means that they can install those services repeatedly and consistently without cumbersome, time-consuming, and error-prone manual setup. Admins can use virtualization security policies to mandate certain security configurations based on the role of the virtual machine. Policies can even increase resource efficiency by retiring unused virtual machines to save on space and computing power. Additionally, software-defined VMs allow admins to run multiple redundant virtual machines alongside each other and failover between them when problems arise. Running multiple redundant physical servers is more expensive.

Storage virtualization generally refers to a type of virtualization that enables all the storage devices on the network, whether they are installed on individual servers or stand-alone storage units, to be accessed and managed as a single storage device. Typically, storage virtualization masses all blocks of storage into a single shared pool, from which they can be assigned to any VM on the network as needed. An input-output (IO) request for a virtualized resource may pass through multiple layers of virtualization, and sometimes also through the network (e.g., the Internet, a specialized network for storage IO requests, etc.)

In many configurations, the data that an application is reading or writing can be distributed across multiple servers on cloud, so it might so happen that some IO requests deal with more important and sensitive data than the others. Accordingly, some embodiments of this disclosure may provide different security levels associated with each individual IO request. The security levels, in turn, may be defined by a service level agreement (SLA). In this way, not all of the data in all the IO requests are treated as equally important in some embodiments, and thus, not all of the data goes through the same security processes.

Some embodiments may include a system and associated methods for enabling SLA categories with respect to security for individual IO requests made by an application to a storage, where storage is virtualized and distributed on a cloud. Each IO request in some embodiments can specify a security related SLA by adding an additional header in the requests. The header may be processed at each layer of virtualization and processed accordingly.

Some embodiments may identify security SLA required for each IO request by analyzing the data content of the request. The SLA can specify security level required by IO request when data is in transit. Some embodiments may then map the SLA to the various components of network security layer, such as an encryption technique. Additionally, some embodiments may provide methods to enable security SLA associated with each IO request, where the SLA can specify security level required by the file during transit.

One feature and advantage of some embodiments is they allow IO requests that are reading or writing important and sensitive data to carry higher security requirements as compared to the IO requests which are dealing with less important data. In this way, some embodiments treat important and/or sensitive IO requests differently from security perspective, which may allow for better usage of security resources and/or allow for a higher degree of security using a given amount of resources.

Another feature and advantage may be that some embodiments include a software defined data security level associated with each IO request. Some IO requests, particularly in the case when a software application is writing to file distributed on cloud, may need more security for an IO request while the data is passing through the network and finally written to a file. This may be a particular advantage in applications with virtualization on the storage layer, as an IO request made by a software application may pass through multiple layers, sometimes involving a network as well, as the data the software application is reading or writing can be distributed across multiple physical devices in cloud environments.

Cloud Computing

Figure 1:
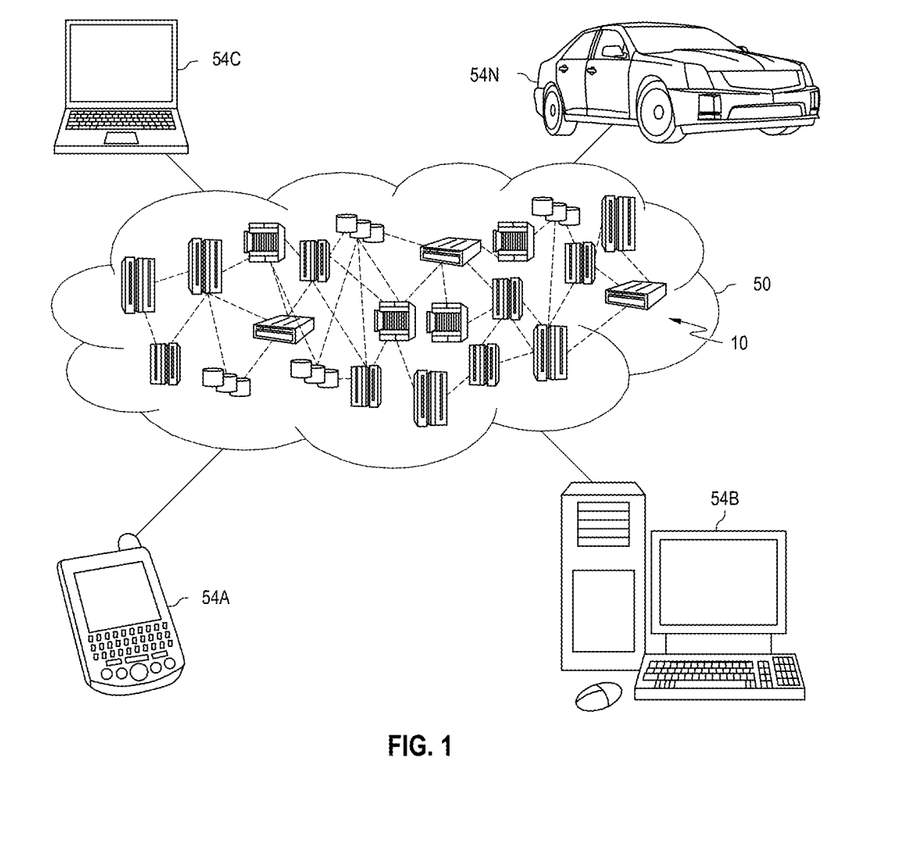
FIG. 1 depicts a cloud computing environment, consistent with some embodiments.

FIG. 1 illustrates a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
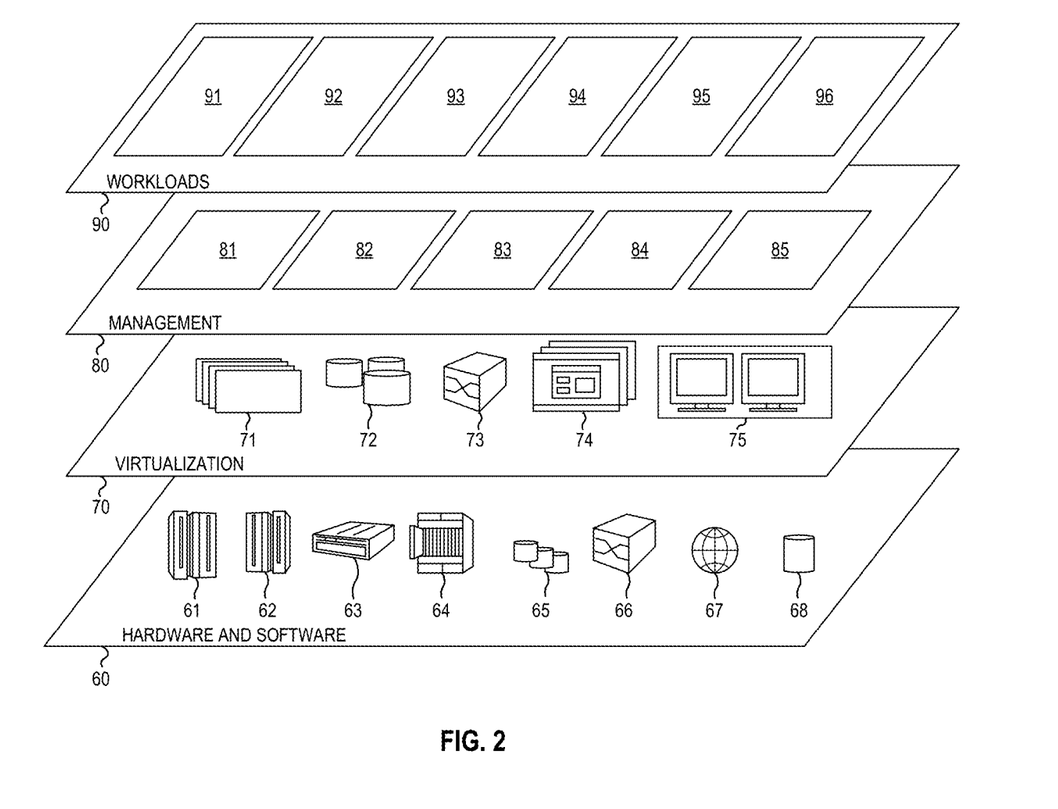
FIG. 2 depicts abstraction model layers, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a SLA console 96.

Data Processing System

Figure 3:
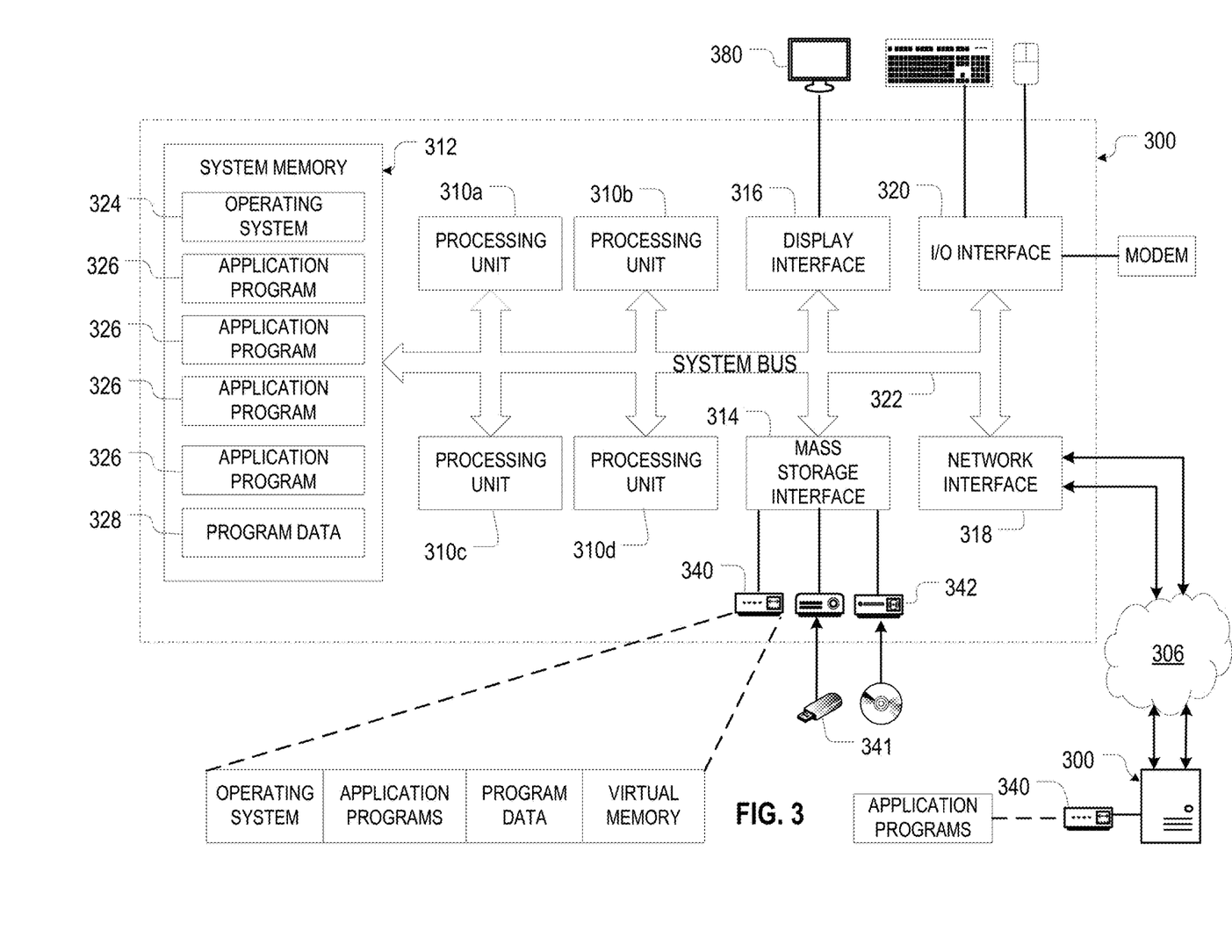
FIG. 3 depicts a data processing system, consistent with some embodiments.

FIG. 3 illustrates an embodiment of a data processing system (DPS) 300 suitable for use as a cloud computing node 10 in a cloud computing environment 50, consistent with some embodiments. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multiprocessor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the computer systems 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Data Security Layer

Figure 4:
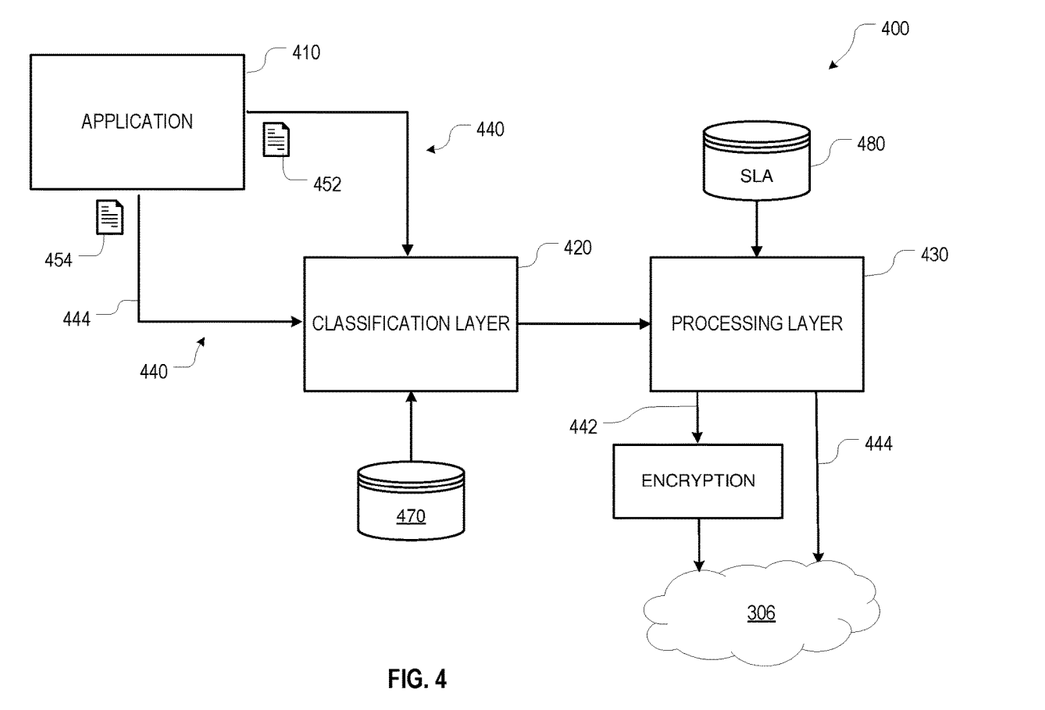
FIG. 4 is a system diagram for a system having a software defined data security layer, consistent with some embodiments.

FIG. 4 is a system diagram for a system 400 having a software defined data security layer, consistent with some embodiments. This system diagram includes a local application 410 (i.e., executing on the same DPS as the data security layer), a classification layer 420, and a processing layer 430. The application 410 in this embodiment may generate a plurality IO requests 440 generated by the local application 410 to access (e.g., read or write) data stored on an external data source. The classification layer 420 may analyze each of those IO requests, determine that some of the requests 440 are requests 442 to access more sensitive data 452 as defined by the relevant SLA for the system 400. The classification layer 420 may also determine that some of those IO requests 440 are requests 444 to less access sensitive data 454 as also defined by the relevant SLA 480 for the system 400.

In operation, the application 410 may initiate an IO request 440 to read or write data on some virtualized storage device, such as a cloud server. The classification layer 420 may intercept and analyze this request. Based on the content (i.e., the payload of the IO request) and/or metadata of data to be read or written, the classification layer 420 may generate codes with respect to a SLA security level required for each individual IO request 440, and then append the SLA security codes to that request. In some embodiments, the disclosure may work based on the SLA defined for the IO request. The application layer may decide the SLA based on the data that would be handled by the IO request.

The processing layer 430 may translate the SLA encoding into network layer parameters. In the case of a IO request 442 for more sensitive data 452, the processing layer 430 may determine that a high level of security is required, and which is translated to strong encryption required at network layer. In this case, the processing layer 430 may, for example, route the IO request 442 so that it will be encrypted with relatively stronger encryption (e.g., a more computationally intensive technique and/or using a longer key). In the case of an IO request 444 involving less-sensitive data 454, the processing layer 430 may determine that only a low level of security is required, and thus, may route the IO request 444 to be sent without encryption or with relatively weaker encryption.

Figure 5:
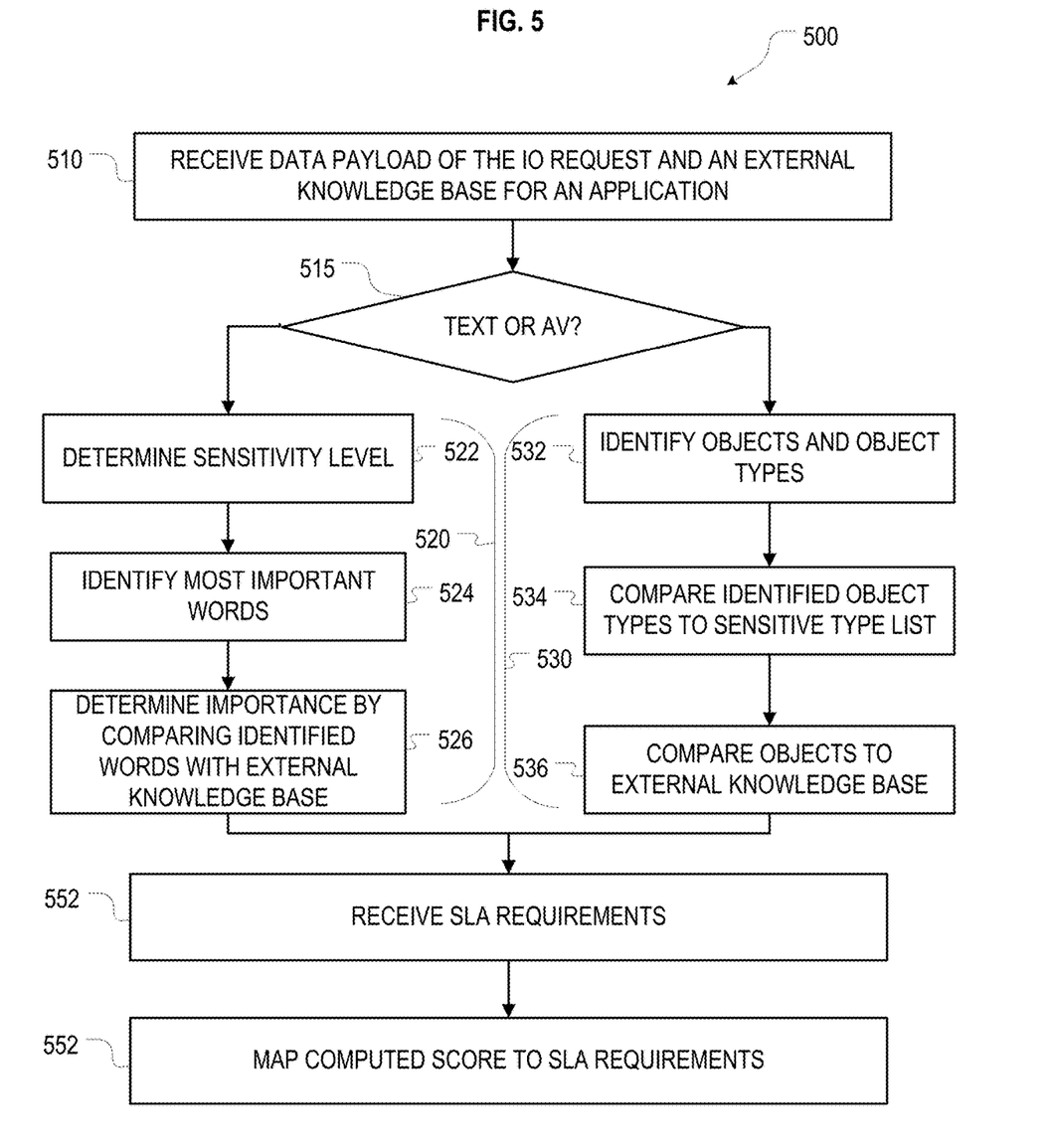
FIG. 5 is a flow chart illustrating the operation of a classification layer in more detail, consistent with some embodiments.

FIG. 5 is a flow chart 500 illustrating the operation of a classification layer 420 in more detail, consistent with some embodiments. At operation 510, the input to the classification layer 420 is received (e.g., intercepted). In some embodiments, the input may include the data payload of the IO request (e.g., the data read or data to be written) and an external knowledge base 470 (see, FIG. 4) about the application 420 and its data application needs. The data payload of the intercepted IO request is then analyzed to determine if it contains textual or audiovisual data at operation 515.

If the intercepted IO request is to read or write textual data, then natural language processing (NLP) techniques such as parsing, classification, etc., may be used at operation sequence 520 to classify the content of the data payload and then compute its sensitivity and importance. More specifically, for payloads involving textual data, the text may first be classified as sensitive or not at operation 522. In some embodiments, this may include parsing the text for key words and phrases indicative of sensitive content, such as "Confidential," "Birth Date," Credit Card," or the like. In other embodiments, this may include analyzing for patterns of data that are commonly used with confidential data, such as a nine digit number in a 3-2-4 pattern commonly used for Social Security numbers or a ten digit number in 3-3-4 format commonly used for telephone numbers. Still other embodiments may analyze the full context of the data payload to look for sensitive information, such as scanning for sentence fragments indicative of a bank or stock transaction, communication with a doctor or lawyer, customer lists, business projections, and the like.

Next, using parsing or additional NLP, the most important and/or sensitive words in the data payload may be identified at operation 524 (e.g., nouns, verbs, etc.) The important words may then be compared with the external knowledge base 470 specific the application 410 and its data requirement to compute the importance of the data payload at operation 526. Using the above computed importance score, an SLA category may be assigned to the IO request. The sensitivity and the computed importance may then be combined to get a final security score for the data payload at operation 528.

If the data read or to be written is image data, then the classification layer 420 may use object detection techniques to compute the sensitivity and importance of the data at operation sequence 530. This may include identifying the objects in the image at operation 532, then comparing the identified objects with a list of sensitive objects and object types in the external knowledge base 470 at operation 534. For each object, the sensitivity and importance may be combined at operation 536 to get a final score for the data payload.

Using the score assigned, some embodiments may compute an SLA category to the IO request. In some embodiments, this may include receiving SLA requirements at operation 552. Next, the classification layer 420 may map the computed score against the SLA requirements at operation 554. This may include bucketizing the SLA requirements into a number of buckets (e.g., five) and assigning a security SLA to each bucket. That is, the requirements defined in the SLA may be bucketized based on its importance, where each bucket defines the importance level of the SLA. For example, if an embodiment uses three buckets, then the importance level of the SLA would be defined based on the rank of the bucket.

Figure 6:
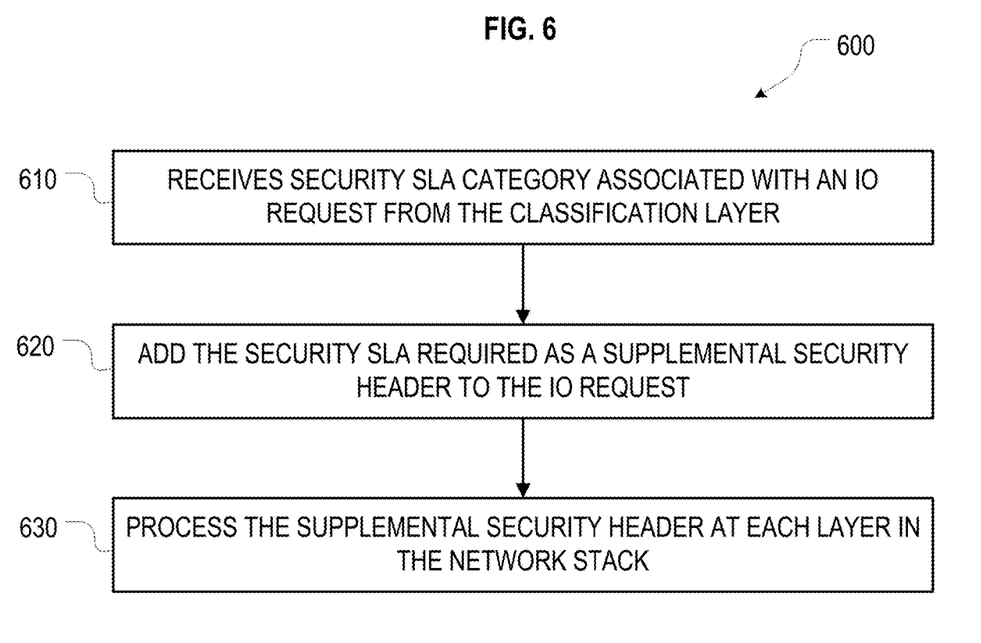
FIG. 6 is a flow chart illustrating the operation of mapping layer in more detail, consistent with some embodiments.

FIG. 6 is a flow chart 600 illustrating the operation of a mapping layer 430 in more detail, consistent with some embodiments. At operation 610, the mapping layer 430 receives as input a security SLA category associated with an IO request from the classification layer 430, calculated using the method described with reference to FIG. 5. At operation 620, the mapping layer 430 may add the security SLA required as a supplemental security header to the IO request. In some embodiments, this may include creating another header for the security requirement, in addition to remaining headers. At operation 630, the supplemental security header may be processed at each layer in the network stack between the application 410 and the storage device, and then passed on the next layer. For example, at the network layer, the supplemental header may be processed and translated to security parameters such that a strong encryption technique and authentication mechanism are identified and implemented. Next, at operation 640, in the handshaking process, the encryption technique and authentication mechanism are shared with the other party, such as the storage service or device.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A software defined data security level method, comprising:
    intercepting, by a processor at a data security layer, an input/output (IO) request from a local software application, wherein the IO request includes a header and a data payload;
    analyzing, by the processor at the data security layer, the data payload of the IO request relative to a service level agreement (SLA); and
    assigning, by the processor at the data security layer, a security level to the IO request based on the analysis.

2. The method of claim 1, further comprising:
    intercepting a plurality of input/output (IO) requests from the software application;
    individually analyzing the data payload of each of the plurality of IO requests; and
    individually assigning the security level to each of the plurality of IO requests based on the analysis.

3. The method of claim 2, further comprising identifying a security SLA required for each of the plurality of IO requests, wherein the security SLA specifies a security level required by the data payload while in transit.

4. The method of claim 1, further comprising mapping the security level to network layer parameters for the IO request.

5. The method of claim 4, wherein the network layer parameters comprises an encryption technique for the IO request.

6. The method of claim 1, wherein analyzing the data payload of the IO request comprises:
    determining that the data payload comprises textual information;
    analyzing the textual information using natural language processing (NLP) to determine a sensitivity of the textual information;
    calculating an importance of the data payload at least in part by:
        extracting key words from the textual information; and
        comparing the key words to an external data source; and
    combining the sensitivity and the importance into a security score.

7. The method of claim 1, wherein analyzing the data payload of the IO request comprises:
    determining that the data payload comprises audiovisual information;
    identifying objects and object types in the audiovisual information using object detection;
    determining a sensitivity for the audiovisual information using the identified object types;
    comparing the identified objects to an external knowledge base to determine an importance; and
    combining the sensitivity and the importance into a security score.

8. The method of claim 1, further comprising appending a service level agreement category to the IO request as a supplemental header.

9. The method of claim 8, further comprising selectively processing the IO request in a network stack based on the supplemental header.

10. The method of claim 9, wherein the selective processing includes selectively encrypting the IO request.

11. The method of claim 1, wherein the input/output (IO) request comprises a write request from the software application executing on the processor to an external data source.

12. A data processing system, comprising a processor and a memory coupled to the processor, wherein the memory contains program instructions executable by the processor to cause the processor to:
    intercept, at a data security layer, an input/output (IO) request from a local software application, wherein the IO request includes a header and a data payload;
    analyze, at the data security layer, the data payload of the IO request relative to a service level agreement (SLA); and
    assign, at the data security layer, a security level to the IO request based on the analysis.

13. The data processing system of claim 12, further comprising program instructions to:
    intercept a plurality of input/output (IO) requests from the software application;
    individually analyze the data payload of each of the plurality of IO requests; and
    identify a security SLA required for each of the plurality of IO requests, wherein the security SLA specifies a security level required by the data payload while in transit.

14. The data processing system of claim 12, further comprising program instructions to map the security level to network layer parameters for the IO request, wherein the network layer parameters comprises an encryption technique for the IO request.

15. The data processing system of claim 12, further comprising program instructions to:

append a service level agreement category to the IO request as a supplemental header; and selectively process the IO request in a network stack based on the supplemental header.

16. A computer program product for a software defined data security layer, the computer program product comprising a computer readable storage medium having program instructions embodied therewith, the program instructions executable by a processor to cause the processor to:

intercept, at a data security layer, an input/output (IO) request from a local software application, wherein the IO request includes a header and a data payload;

analyze, at the data security layer, the data payload of the IO request relative to a service level agreement (SLA); and assign, at the data security layer, a security level to the IO request based on the analysis.

17. The computer program product of claim 16, further comprising program instructions to:

intercept a plurality of input/output (IO) requests from the software application;

individually analyze the data payload of each of the plurality of IO requests; and identify a security SLA required for each of the plurality of IO requests, wherein the security SLA specifies a security level required by the data payload while in transit.

18. The computer program product of claim 16, further comprising program instructions to map the security level to network layer parameters for the IO request, wherein the network layer parameters comprises an encryption technique for the IO request.

19. The computer program product of claim 16, further comprising program instructions to:

append a service level agreement category to the IO request as a supplemental header; and selectively process the IO request in a network stack based on the supplemental header.

20. The computer program product of claim 19, wherein the selective processing includes selectively encrypting the IO request.

* * * * *